(12) United States Patent
Sugiura et al.

(10) Patent No.: US 8,793,157 B2
(45) Date of Patent: Jul. 29, 2014

(54) INFORMATION PROVIDING DEVICE, METHOD OF PROCESSING REWARD PAYMENT, REWARD PAYMENT PROCESSING PROGRAM, AND RECORDING MEDIUM WITH REWARD PAYMENT PROCESSING PROGRAM RECORDED THEREON

(75) Inventors: Kenji Sugiura, Shinagawa-ku (JP); Yasuaki Shirogane, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/807,225

(22) PCT Filed: Jun. 28, 2011

(86) PCT No.: PCT/JP2011/064732
§ 371 (c)(1),
(2), (4) Date: Dec. 27, 2012

(87) PCT Pub. No.: WO2012/002349
PCT Pub. Date: Jan. 5, 2012

(65) Prior Publication Data
US 2013/0110645 A1    May 2, 2013

(30) Foreign Application Priority Data
Jun. 29, 2010    (JP) ................................. 2010-147721

(51) Int. Cl.
*G06Q 30/00*    (2012.01)
(52) U.S. Cl.
USPC .................. 705/14.16; 705/14.1; 705/14.19; 705/14.4; 705/14.69; 705/14.7; 705/14.73

(58) Field of Classification Search
None
See application file for complete search history.

(56) References Cited

U.S. PATENT DOCUMENTS

| 6,279,112 | B1 * | 8/2001 | O'Toole et al. | 726/10 |
| 7,949,563 | B2 * | 5/2011 | Collins | 705/14.43 |
| 8,291,492 | B2 * | 10/2012 | McNally et al. | 726/21 |
| 2002/0161648 | A1 * | 10/2002 | Mason et al. | 705/14 |
| 2004/0006509 | A1 * | 1/2004 | Mannik et al. | 705/14 |
| 2005/0076051 | A1 | 4/2005 | Carobus et al. | |
| 2007/0078670 | A1 * | 4/2007 | Dave et al. | 705/1 |
| 2007/0106551 | A1 * | 5/2007 | McGucken | 705/10 |

(Continued)

FOREIGN PATENT DOCUMENTS

| JP | 2006-18460 A | 1/2006 |
| JP | 2008/152431 A | 7/2008 |

(Continued)

OTHER PUBLICATIONS

Dave Ragget, et al. HTML 4.01 Specification, XP-002293860, W3C, pp. 1-389, Date: Dec. 24, 1999.

(Continued)

*Primary Examiner* — John G Weiss
*Assistant Examiner* — Meredith A Long
(74) *Attorney, Agent, or Firm* — Sughrue Mion, PLLC

(57) ABSTRACT

An information providing device can provide an arrangement, in addition to conventional affiliate programs, through which affiliators or the like can get rewards. In the information providing device, when a user of a terminal device specifies an advertisement display area, a partial area including a position specified in the advertisement display area is specified such that a reward is paid to the user allocated to the partial area.

26 Claims, 8 Drawing Sheets

(56) References Cited

U.S. PATENT DOCUMENTS

| | | | |
|---|---|---|---|
| 2007/0121843 A1* | 5/2007 | Atazky et al. | 379/114.13 |
| 2007/0150347 A1* | 6/2007 | Bhamidipati et al. | 705/14 |
| 2007/0233736 A1* | 10/2007 | Xiong et al. | 707/104.1 |
| 2008/0040653 A1* | 2/2008 | Levine | 715/205 |
| 2008/0103900 A1* | 5/2008 | Flake et al. | 705/14 |
| 2009/0192929 A1* | 7/2009 | Hoeflinger et al. | 705/35 |
| 2009/0281852 A1* | 11/2009 | Abhari et al. | 705/7 |
| 2010/0198697 A1* | 8/2010 | Brown et al. | 705/14.73 |
| 2010/0332296 A1* | 12/2010 | Gharabally | 705/14.2 |
| 2011/0112911 A1* | 5/2011 | Birnholz et al. | 705/14.69 |
| 2011/0145160 A1* | 6/2011 | Hajiaghayi et al. | 705/319 |
| 2011/0307801 A1* | 12/2011 | Sherman | 715/751 |
| 2012/0005022 A1* | 1/2012 | Lee | 705/14.54 |

FOREIGN PATENT DOCUMENTS

| | | |
|---|---|---|
| JP | 2008-176570 A | 7/2008 |
| JP | 2008-191902 A | 8/2008 |
| JP | 2008-269364 A | 11/2008 |
| JP | 2009-3840 A | 1/2009 |
| JP | 2010-73172 A | 4/2010 |
| WO | 99/62033 | 12/1999 |

OTHER PUBLICATIONS

Brauer M. et al., Open Office Specification 1.0, XP-002404030, OASIS Open, pp. 1-607, Date: Mar. 22, 2004.

Steven M. Schafer, HTML, XHTML, and CSS Bible, Fifth Edition, John Wiley & Sons, Print ISBN: 978-0-470-52396-4, Web ISBN:0-470523-96-4, XP-055111551, pp. 2, Date: Jan. 26, 2010.

x,y coordinates from an <input type="image"> —JavaScript/Ajax/DHTML, XP-055111592, pp. 1-5, Date: Aug. 24, 2006.

Redaktion Selfhtml et al, Verweis-sensitive Grafiken (Image Maps), SELFHTML:HTML/XHTML/Grafiken/Verweis-sensitive Grafiken (Image Maps), XP-055111653, http://de.selfhtml.org//html/grafiken/verweis sensitive.htm pp. 1-4, Date: Apr. 2, 2014.

* cited by examiner

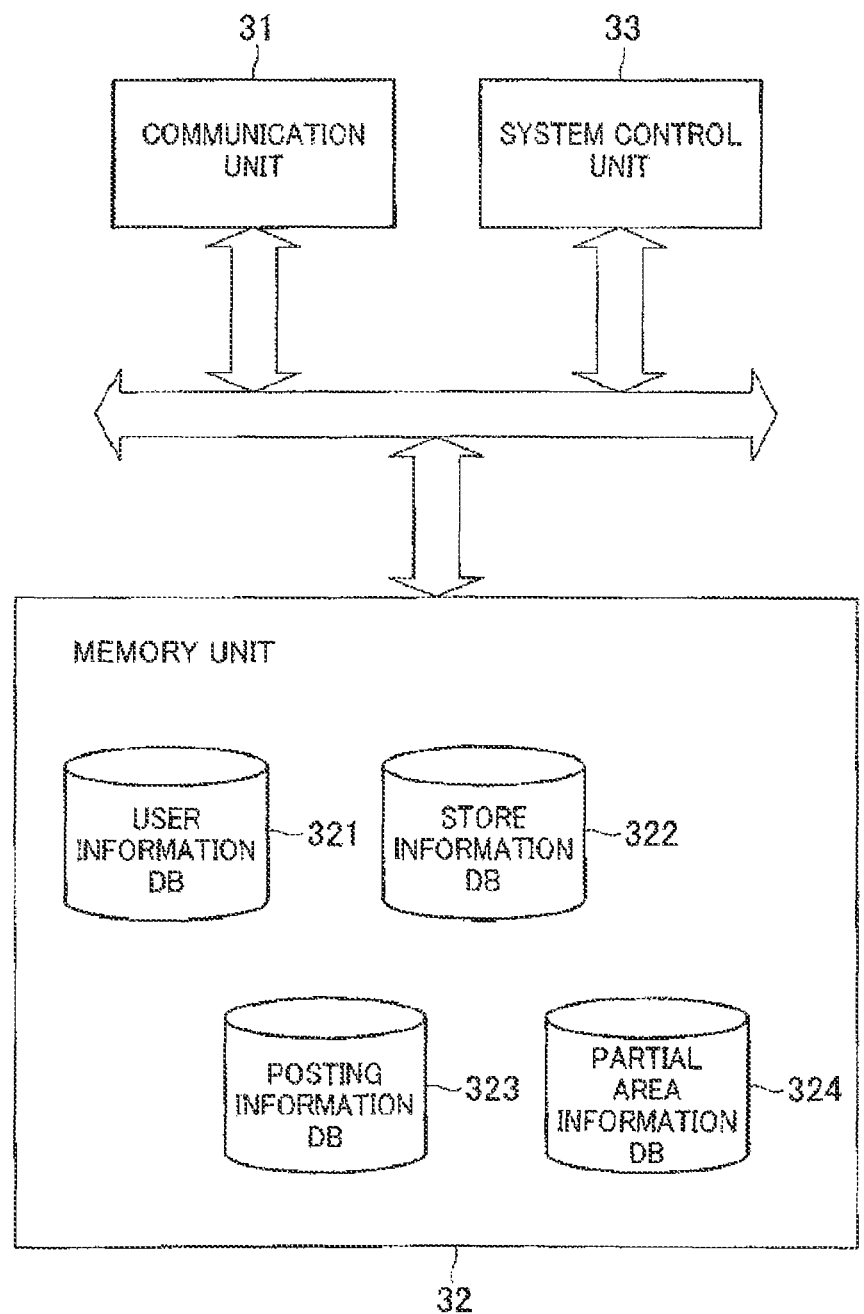

| USER INFORMATION DB |
|---|
| USER ID |
| PASSWORD |
| NICKNAME |
| URL OF POSTING INFORMATION ACQUISITION DESTINATION SITE |
| POINT |
| NAME |
| ADDRESS |
| TELEPHONE NUMBER |
| E-MAIL ADDRESS |
| ..... |

| STORE INFORMATION DB |
|---|
| STORE ID |
| STORE NAME |
| ADDRESS |
| TELEPHONE NUMBER |
| E-MAIL ADDRESS |
| URL OF STORE PAGE |
| PRODUCT INFORMATION OF PRODUCT RANGE |
| AFFILIATE REWARD PAYMENT AVAILABILITY |

| POSTING INFORMATION DB |
|---|
| PRODUCT ID |
| POSTING DATE |
| USER ID OF POSTER |
| POSTING INFORMATION |
| URL OF POSTING INFORMATION ACQUISITION DESTINATION SITE |

| PARTIAL AREA INFORMATION DB |
|---|
| AREA ID OF PARTIAL AREA |
| COORDINATE OF PARTIAL AREA |
| USER ID OF POSTER |

FIG.4

| PRODUCT (PRODUCT ID) | POSTING DATE | POSTER (USER ID) | | POSTING INFORMATION | | URL OF POSTING INFORMATION ACQUISITION DESTINATION SITE |
|---|---|---|---|---|---|---|
| S00001 | 2010/5/10 15:00 | Uxx1 | REVIEW | EVALUATION: 3 | NUMBER OF VIEWS: 70 | http://review.abc.co.jp/11111/p1/ |
| | 2010/5/10 15:02 | Uxy2 | TWEET | PRICES IS HIGH. NUMBER OF FUNCTIONS IS A LITTLE... | NUMBER OF VIEWS: 7900 / NUMBER OF FOLLOWERS: 60 | http://tsubuyaki.abc.co.jp/aoki002/ |
| | 2010/5/10 15:03 | Uyy3 | REVIEW | DESIGN AND OPERABILITY ARE VERY GOOD, AND GREATLY PLEASING. | NUMBER OF VIEWS: 70 | http://shopping.abc.co.jp/shpo-22222/ |
| | 2010/5/10 15:03 | Uxx1 | ARTICLE | THIS IS A RECOMMENDED CAMERA.... | NUMBER OF VIEWS: 800 / NUMBER OF INBOUND LINKS: 80 | http://blog.abc.co.jp/higuchi001/ |
| | ..... | ..... | ..... | ..... | ..... | ..... |
| S00002 | 2010/5/10 15:01 | Uxx1 | REVIEW | EVALUATION: 1; .... | NUMBER OF VIEWS: 70 | http://review.abc.co.jp/11112/p1/ |
| | 2010/5/10 15:03 | Uyy5 | WORD-OF-MOUTH | DESIGN IS NOT SO GOOD. | NUMBER OF VIEWS: 70 | http://shopping.abc.co.jp/shop-33333/ |
| | 2010/5/10 15:05 | Uxx1 | ARTICLE | THIS IS A RECOMMENDED VIDEO CAMERA.... | NUMBER OF VIEWS: 800 / NUMBER OF TRACK BACKS: 5 | http://blog.abc.co.jp/higuchi001/ |
| | ..... | ..... | ..... | ..... | | ..... |
| S00003 | 2010/5/10 15:04 | Uxx1 | ..... | ..... | | http://blog.abc.co.jp/higuchi001/ |
| | ..... | ..... | ..... | ..... | | ..... |
| ..... | ..... | ..... | ..... | ..... | | ..... |

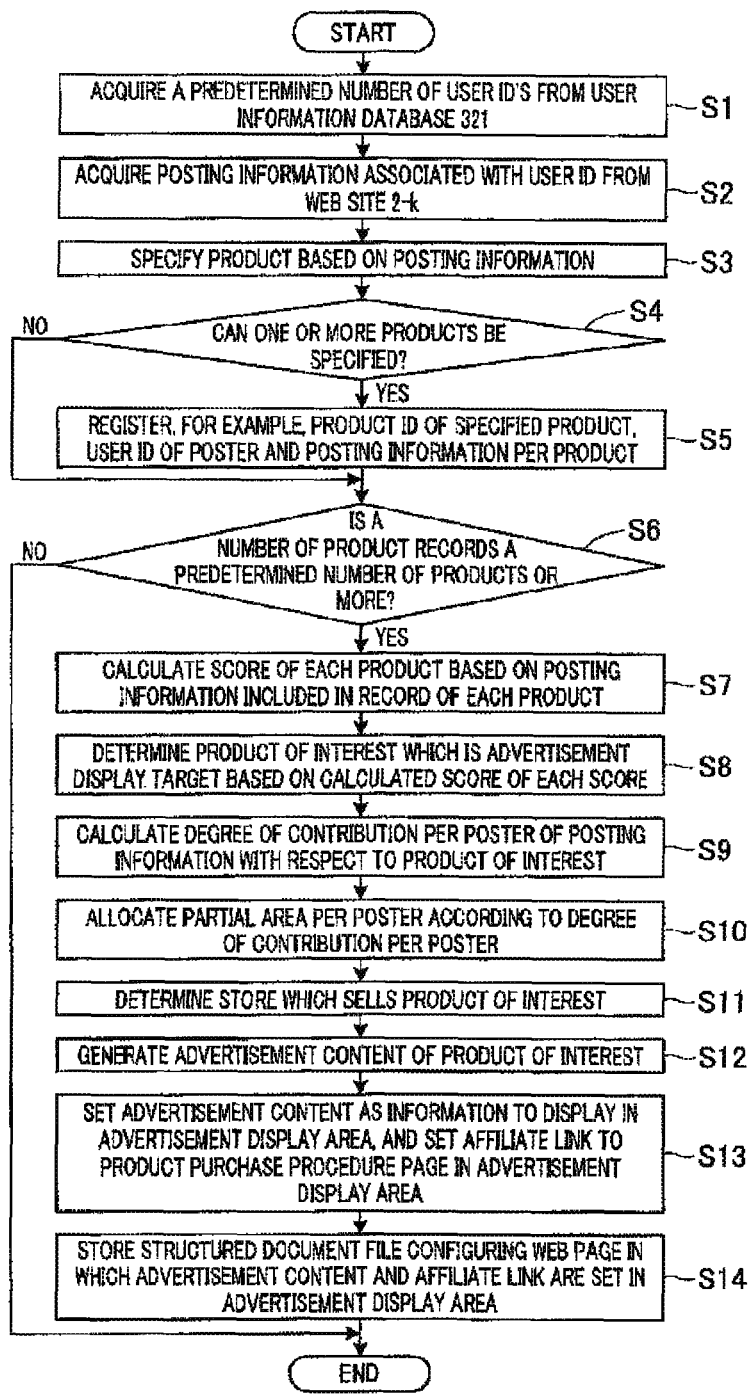

FIG.7

EXAMPLE OF TABLE OF CONVERTING SCORE
CALCULATION ELEMENT INTO CONVERSION POINTS

| NUMBER OF POSTS | 1 TO 1000 HITS: 10p |
| --- | --- |
| | 1001 TO 2000 HITS: 20p |
| | 10p UP FOR EVERY 1000 HITS THEREAFTER |
| NUMBER OF VIEWS | 1 TO 500 HITS: 10p |
| | 501 TO 1000 HITS: 20p |
| | 10p UP FOR EVERY 500 HITS THEREAFTER |
| NUMBER OF REPLIES | 1 TO 100 HITS: 10p |
| | 101 TO 200 HITS: 20p |
| | 10p UP FOR EVERY 100 HITS THEREAFTER |
| NUMBER OF FOLLOWERS | 1 TO 50 HITS: 10p |
| | 51 TO 100 HITS: 20p |
| | 10p UP FOR EVERY 50 HITS THEREAFTER |
| NUMBER OF INBOUND LINKS | 1 TO 20 HITS: 10p |
| | 21 TO 40 HITS: 20p |
| | 10p UP FOR EVERY 20 HITS THEREAFTER |
| ... | ... |
| | ... |

INFORMATION PROVIDING DEVICE, METHOD OF PROCESSING REWARD PAYMENT, REWARD PAYMENT PROCESSING PROGRAM, AND RECORDING MEDIUM WITH REWARD PAYMENT PROCESSING PROGRAM RECORDED THEREON

CROSS REFERENCE TO RELATED APPLICATIONS

This application is a National Stage of International Application No. PCT/JP2011/064732 filed Jun. 28, 2011, claiming priority based on Japanese Patent Application No. 2010-147721 filed Jun. 29, 2010, the contents of all of which are incorporated herein by reference in their entirety.

TECHNICAL FIELD

The present invention relates to a technical field of, for example, an information providing device which provides web pages including advertisement display areas, to terminal devices through a network.

BACKGROUND ART

Conventionally, commercial transaction systems are known which connect to a network such as Internet using a terminal device such as a personal computer, and enable commercial transaction of purchasing products or reserving use of services through web pages provided from, for example, web servers. Among these commercial transaction systems, a so-called affiliate program (affiliate system) is known. The affiliate program is a technique of, when a product of an advertiser is purchased through an affiliate link set in, for example, banner advertisement of the product listed on a web page such as a blog, paying a reward for an affiliator of the web page. Alternately, the affiliate program is a technique of, when banner advertisement listed on a web page such as a blog is clicked by a person other than an affiliator of the web page, paying a reward for the affiliator of the web page based on a clicking count.

In recent years, an affiliate program is developed and is proposed which enables commercial transaction using a mobile telephone and supports commercial transaction using a mobile telephone.

CITATION LIST

Patent Literature

Patent Literature 1: Japanese Patent Application Laid-Open No. 2006-18460

SUMMARY OF INVENTION

Technical Problem

However, an affiliate program requires that an affiliator of a web page such as a blog needs to perform an operation of acquiring an affiliate link of a predetermined product and setting this affiliate link to web pages one by one, and this operation is complicated. Further, there is also a problem that people who do not get used to performing an operation of a terminal device or people who are not familiar with an affiliate program sense difficulty of this operation and the like.

The present invention is made in light of the above problem, and it is therefore an object of the present invention to provide an information providing device, a method of processing reward payment, a reward payment processing program, and a recording medium with reward payment processing program recorded thereon which can provide a system in addition to a conventional affiliate program through which, for example, affiliators can get rewards.

Solution to Problem

In order to solve the above problem, an exemplary embodiment of the invention describes an information providing device which provides display data including an advertisement display area, to a terminal device through a network, the information providing device comprising:

a user information memory means that associates and stores partial area specifying information for specifying a partial area included in the advertisement display area, and user specifying information for specifying a user, per partial area;

a transmitting means that transmits display data including the advertisement display area, to the terminal device;

a position information acquiring means that acquires position information specified in the advertisement display area, from the terminal device;

a partial area specifying means that specifies the partial area including the acquired position information; and a reward information memory means that specifies the user based on partial area specifying information associated with a partial area specified by the partial area specifying means, and associates and stores information of a reward paid for the specified user and the user specifying information in the user information memory means.

According to the present invention, it is possible to increase channels in addition to conventional affiliate programs through which, for example, affiliators can get rewards. Further, a reward is paid for the user associated with the specified partial area, so that it is not necessary to perform calculation to distribute a reward at a rate matching the degree of contribution of each of a plurality of users and, consequently, it is possible to reduce a load on a system.

The information providing device according to an embodiment, wherein, when commercial transaction is performed through link information associated with a site which is set in the advertisement display area and in which commercial transaction of the commercial transaction target is performed, the reward information memory means associates and stores information of the reward paid for the user associated with the partial area included in the advertisement display area in which the link information is set, and the user specifying information, in the user information memory means.

According to the present invention, it is possible to increase channels in addition to conventional affiliate programs through which an affiliator can get an affiliate reward.

The information providing device according to an embodiment, further comprising:

a posting information acquiring means that acquires posting information associated with the user specifying information registered in a predetermined site on the network;

a contribution degree calculating means that calculates a degree of contribution associated with the posting information per user, based on the acquired posting information; and an area allocating means that allocates the partial area per user according to the calculated degree of contribution of each user.

According to the present invention, it is possible to increase the probability that a partial area allocated to a user of a high degree of contribution is specified, and, as a result, it is possible to increase the probability that a reward is given to the user and, consequently, increase the user's motivation for posting.

The information providing device according to an embodiment, wherein the area allocating means allocates a partial area which displays information for triggering specifying for a user of the highest degree of contribution.

According to the present invention, it is possible to further increase the probability that a partial area allocated to a user of a high degree of contribution is specified, and, as a result, it is possible to further increase the probability that a reward is given to the user and, consequently, increase the user's motivation for posting.

The information providing device according to an embodiment, further comprising:

a specifying count memory means that stores a specifying count of the partial area per partial area, wherein the area allocating means compares specifying counts in the respective partial areas stored in the specifying count memory means, and allocates the user of a relatively high degree of contribution, to a partial area of a relatively high specifying count.

According to the present invention, it is possible to further increase the probability that a partial area allocated to a user of a high degree of contribution is specified, and, as a result, it is possible to further increase the probability that a reward is given to the user and, consequently, increase user's motivation for posting.

The information providing device according to an embodiment, further comprising:

a changing means that changes a user allocated to the partial area, based on a predetermined condition.

According to the present invention, it is possible to change an allocation to an adequate allocation according to a situation after the partial area is allocated.

The information providing device according to an embodiment, further comprising:

a specifying count memory means that stores a specifying count of the partial area per partial area, wherein the allocation changing means changes a user allocated to a partial area comprising the specifying count exceeding a threshold.

According to the present invention, it is possible to change an allocation such that a partial area which is likely to be specified is allocated to a user to who a partial area which is not specified a number of times less than a threshold is allocated.

According to another exemplary embodiment, there is provided a method of processing reward payment executed by a computer which provides display data including an advertisement display area, to a terminal device through a network, the method comprising:

a step of associating and storing partial area specifying information for specifying a partial area included in the advertisement display area and user specifying information for specifying a user, per partial area;

a step of transmitting display data including the advertisement display area, to the terminal device;

a step of acquiring position information specified in the advertisement display area, from the terminal device;

a step of specifying the partial area including the acquired position information; and a step of specifying the user based on partial area specifying information associated with a partial area specified by the partial area specifying means, and associating and storing information of a reward paid for the specified user and the user specifying information.

According to another exemplary embodiment, there is provided a reward payment processing program causing a computer which provides display data including an advertisement display area, to a terminal device through a network, to function as:

a user information memory means that associates and stores partial area specifying information for specifying a partial area included in the advertisement display area, and user specifying information for specifying a user, per partial area;

a transmitting means that transmits display data including the advertisement display area, to the terminal device;

a position information acquiring means that acquires position information specified in the advertisement display area, from the terminal device;

a partial area specifying means that specifies the partial area including the acquired position information; and a reward information memory means that specifies the user based on partial area specifying information associated with a partial area specified by the partial area specifying means, and associates and stores information of a reward paid for the specified user and the user specifying information in the user information memory means.

According to another exemplary embodiment, there is provided a recording medium with a reward payment processing program recorded thereon, the program causing a computer which provides display data including an advertisement display area, to a terminal device through a network, to function as:

a user information memory means that associates and stores partial area specifying information for specifying a partial area included in the advertisement display area, and user specifying information for specifying a user, per partial area;

a transmitting means that transmits display data including the advertisement display area, to the terminal device;

a position information acquiring means that acquires position information specified in the advertisement display area, from the terminal device;

a partial area specifying means that specifies the partial area including the acquired position information; and a reward information memory means that specifies the user based on partial area specifying information associated with a partial area specified by the partial area specifying means, and associates and stores information of a reward paid for the specified user and the user specifying information in the user information memory means.

Advantageous Effects of Invention

According to the present invention, it is possible to increase channels in addition to conventional affiliate programs through which, for example, affiliators can get rewards.

BRIEF DESCRIPTION OF DRAWINGS

FIG. 2 is a block diagram illustrating a schematic configuration example of an information providing server 3 according to the present embodiment.

FIG. 3A to FIG. 3D are views illustrating a configuration example of information to be registered in each database.

FIG. 4 is a view illustrating an example of information registered in a posting information database 323.

FIG. 6 is a flowchart illustrating setting processing of advertisement content and an affiliate link in a system control unit 33 of the information providing server 3.

FIG. 7 is a view illustrating an example of a table for converting a score calculation element into conversion points.

DESCRIPTION OF EMBODIMENTS

Hereinafter, an embodiment of the present invention will be described with reference to drawings. In addition, the embodiment will be described where the present invention is applied to an information providing system.

[1. Outline of Configuration and Function of Information Providing System]

First, an outline of a configuration and a function of an information providing system S according to an embodiment of the present invention will be described using FIG. 1.

Figure 1:
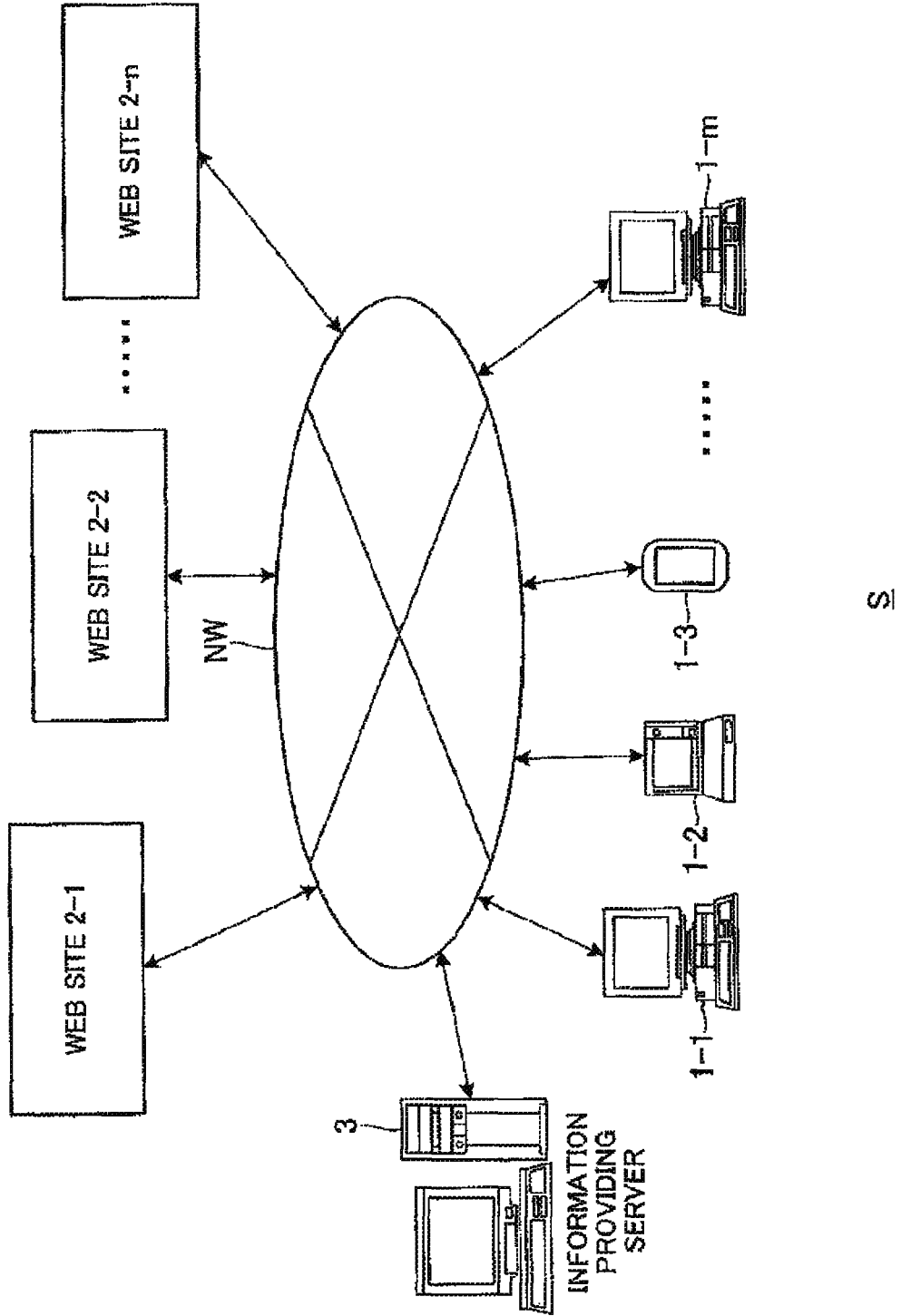
FIG. 1 is a view illustrating an example of a schematic configuration of an information providing system S according to the present embodiment.

FIG. 1 is a view illustrating an example of a schematic configuration of the information providing system S according to the present embodiment.

As illustrated in FIG. 1, the information providing system S employs a configuration including a plurality of user terminals 1-j (j=1, 2 . . . m), a plurality of web sites 2-k (k=1, 2 . . . n) and an information providing server 3 (an example of an information providing device).

The user terminals 1-j, the web sites 2-k and the information providing server 3 can transmit and receive data to and from each other using, for example, TCP/IP for a communication protocol through a network NW. In addition, the network NW employs a configuration including, for example, Internet, a dedicated communication line (for example, CATV (Community Antenna Television) line), a mobile communication network (including, for example, base stations) and a gateway.

The user terminals 1-j have web browser functions, and acquire web pages (an example of display data configuring a display screen) by accessing the web sites 2-k and the information providing server 3, and displays the web pages on window screens displayed on displays. In addition, for the user terminals 1-j, for example, personal computers (PCs), mobile telephones, personal digital assistants (PDA's), smartphones which integrate mobile telephones and personal digital assistants, or mobile game machines are applicable. In addition, an operation unit which receives an operation command from the user of the user terminal 1-j may be, for example, one of a keyboard, a mouse, a remote controller and a touch panel interface.

The web site 2-k employs a configuration including, for example, a web server, an application server and a database server. This web sites 2-k associate and register web pages displayed on window screens of the user terminals 1-j and user specifying information (for example, user IDs) for specifying a user (poster) of posting information (inputted or selected on a web page) posted by the user (poster) through the web page. These web sites 2-k include, for example, blog sites, SNS (Social Networking Service) sites (community sites), mini blog sites (twitter (registered trademark) site), review sites, word-of-mouth sites, product sales sites (shopping sites), travel reservation sites, accommodation reservation sites, and facility use reservation sites (URL (Uniform Resource Locator) of each site is different from each other).

Meanwhile, an example of posting information includes information such as an article, a comment, a word, a tweet, a word-of-mouth, a review or an evaluation (point) for a commercial transaction target. The commercial transaction target includes, for example, a product or service (travel, accommodation, beauty and play facility services). In addition, the following description will be made mainly using a product as an example.

An article, a comment, a word, a tweet, a word-of-mouth and a review which are examples of posting information are generally a string of characters inputted when, for example, a user operates an operation key, and are accompanied by images in some cases. Further, an evaluation is generally points selected when, for example, a user operates a mouse (or performs a tapping operation on a touch panel), from points classified into a plurality of (for example, five) stages. Furthermore, when posting information is a word-of-mouth or a review registered in, for example, a review site, a word-of-mouth site or a product sales site, this posting information includes information such as the number of other users' views of the word-of-mouth or the review. Still further, when posting information is an article registered in a blog site, this posting information includes information such as the number of other users' views of this article, the number of replies to the article from the other users (comments from the other users), the number of inbound links (liking to) this article from the other users (decided by a common referrer) and the number of inbound track backs (tracked back) to this article by the other users. Moreover, when posting information is a tweet registered in a mini blog site, the posting information includes the number of the other users' views of the tweet, the number of followers of the tweet, the number of retweets of the tweet and the number of inbound links to the tweet by the other users. In addition, the number of followers is the number of people followed by the other users (followers) (the tweet is automatically sent to the followers). Further, the number of retweets is the number of tweets cited and posted by the other users. In addition, posting information may include the number of guests from, for example, e-mail magazines distributed to multiple users (a user who is a host is decided based on, for example, a quest ring). The above posting information is acquired by the information providing server 3.

Next, the information providing server 3 is formed with, for example, one or a plurality of server computers having the web server, the application server, and database server, and forms an information providing sites. This information providing server may be, for example, a blog site, an SNS site, a mini blog site, a review site, a word-of-mouth site, a product sales site (shopping site), a travel reservation site, an accommodation reservation site and a facility use reservation site. Further, this information providing site may be included in, for example, a web site 2-1 of the web sites 2-k or a site which works with the web site 2-1 (for example, run by the same operator).

FIG. 2 is a block diagram illustrating a schematic configuration example of the information providing server 3 according to the present embodiment.

As illustrated in FIG. 2, the information providing server 3 has, for example, a communication unit 31, a memory unit 32 and a system control unit 33.

The communication unit 31 connects to the network NW to control communication states between the user terminals 1-j and the web sites 2-k.

The memory unit 32 employs a configuration including, for example, a hard disc drive, and stores an operating system and application programs (including, for example, a reward payment processing program according to the present invention). In addition, the information providing program according to the present invention may be downloaded from, for example, other servers through the network NW, or may be recorded in a recording medium such as a CD-ROM and read through a drive.

Further, the memory unit 32 stores, for example, structured document (for example, HTML (Hyper Text Markup Language) document or XHTML) files configuring web pages (an example of display data including an advertisement display area) for displaying various items of content, and image files. Each content arranged in a web page is configured with, for example, at least one of a text, a still image and a movie. Further, content includes various items of content such as the original content (for example, content including a search result in an Internet market) which the user desires and content for advertisement (hereinafter "advertisement content") such as a banner. For example, a size and an arrangement position of each content in a web page are defined in the above structured document.

Further, with the present embodiment, as described below, a product which is an advertisement display target of advertisement content is dynamically determined based on the above-described posting information. Furthermore, in an advertisement display area of a web page which displays such advertisement content, link information (an example of link information associated with a site for purchase procedure of a product and including, for example, a URL of a product purchase procedure page) for a web page (hereinafter "product purchase procedure page") for performing purchase procedure (commercial transaction) of the determined product is set. Still further, with the present embodiment, this link information is, for example, an affiliate link and, when purchase payment of a product is performed through the affiliate link, a result reward of an affiliate (hereinafter "affiliate reward") is paid for a poster (the user of the above web site 2-k) of posting information of the product. In addition, with the present embodiment, points (an example of reward information) are given as an affiliate reward. In addition, the affiliate reward is by no means limited to points, and may be, for example, electronic money, a discount coupon or a service ticket.

Further, in the memory unit 32, for example, a user information database (DB) 321, a store information database (DB) 322, a posting information database (DB) 323 and a partial area information database 324 are constructed. In addition, the user information database 321 and the partial area information database 324 correspond to a user information memory means which, for example.

FIG. 3 is a view illustrating a configuration example of information to be registered in each database.

In the user information database 321 illustrated in FIG. 3A, user information such as a user ID (user identification information), a password, a nickname, a URL of a posting information acquisition destination site, points (given points), a name, an address, a telephone number and an e-mail address of a user registered in the affiliate program is associated per user and registered.

Meanwhile, the user ID is an example of user specifying information for specifying the user. In addition, user specifying information may be any information such as a nickname or a log-in ID as long as it can specify the user. A URL of a posting information acquisition destination site is an URL of the web site 2-k specified by the user as an acquisition destination of posting information (this URL is not registered depending on a user in some cases). Further, when the posting information acquisition destination site is the web site 2-k which requires log-in upon use, a user ID of the user (this user ID may be the same as or different from a user ID of a user registered in the above affiliate program) used upon this log-in and a password are also associated with the URL of the posting information acquisition destination site and registered in the user information database 321.

Furthermore, points (given points) registered in the user information database 321 are given to a user according to an expense for, for example, purchasing a product or reserving service, or are given to the user as the above affiliate reward. The user can use the given points for all or part of the expense upon payment for, for example, purchasing a product or reserving service.

In the store information database 322 illustrated in FIG. 3B, store information such as a store ID, a store name, an address, a telephone number, an e-mail address, a URL of a store page, product information of a product range and affiliate reward payment availability of a store listed and registered in an Internet market provided from the information providing server 3 is associated per store and registered. Meanwhile, the store ID is an example of providing source specifying information for specifying a store which provides a product. Product information of a product range includes, for example, a product ID, a product name, a product code (for example, JAN code), product description (for example, product description and product features), product image data, sales price information, stock information and affiliate reward payment availability information of each product which is sold at a store. Product information of a product for which an affiliate reward can be paid includes, for example, a rate (for example, 1%) of an affiliate reward.

In the posting information database 323 illustrated in FIG. 3C, information such as a product ID of each product, a user ID of a poster, posting information and a URL of a posting information acquisition destination site (web site 2-k) is associated and registered. In addition, a configuration may be employed where information registered in the posting information database 323 is associated with a user ID and registered in the user information database 321. FIG. 4 is a view illustrating an example of information registered in the posting information database 323. With an example illustrated in FIG. 4, a plurality of records (one record=one row with the example illustrated in FIG. 4) are registered for one product (for example, a product ID is "S00001"). The number of posts can be calculated per product by counting this number of records. Further, posting information illustrated in FIG. 4 includes a posting date (a posting date and time of a year with this example) in addition to information such as an article, a comment, a word, a tweet, a word-of-mouth, a review, an evaluation, the number of views and the number of replies.

In the partial area information database 324 illustrated in FIG. 3D, an area ID of a partial area, coordinate information of the partial area and a user ID of a poster allocated to the partial area are associated per partial area and registered.

Figure 5A:
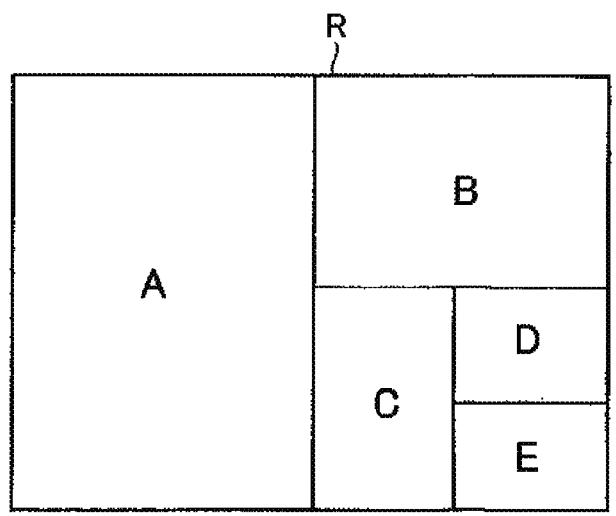
FIG. 5A to FIG. 5B are views illustrating an example of partial areas included in a given advertisement display area.
Figure 5B:
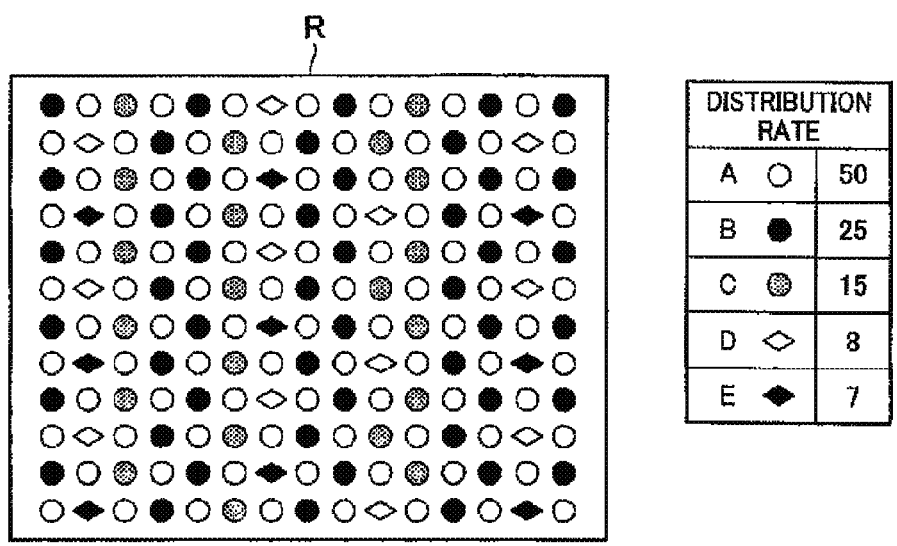

Meanwhile, the partial area refers to a portion of an area in an advertisement display area of a web page which displays advertisement content. That is, the advertisement display area is formed with a plurality of partial areas. FIG. 5 is a view illustrating an example of partial areas included in a given advertisement display area. With the example illustrated in FIG. 5A, each partial area is each rectangular area (A to E) formed by dividing an advertisement display area R into a rectangular shape, and the size of each of the partial areas A to E (an area of the rectangular area) varies from each other. In addition, the size of at least two or more partial areas among each partial area may be the same. Further, the shape of the partial area is by no means limited in particular, and may be, for example, triangular, pentagonal, circular or others. Furthermore, the number of partial areas (five with an example of FIG. 5B) is by no means limited in particular, and may be any number.

Meanwhile, with the example illustrated in FIG. 5B, each partial area is formed with a set of dot areas formed in units of a plurality of pixels (for example, in units of four pixels), and the distribution rate of the dot rates (the rate the dot areas occupy in the advertisement display area R) differs from each other per partial area. For example, the dot areas in the partial area A illustrated in FIG. 5 are represented by 0 symbols, and these dot areas are scattered in the advertisement display area R at 50% of the distribution rate. Further, although the size of each of the partial areas A to E (the total sum of the area of each massing area) differs from each other, at least two or more partial areas of each partial area may be the same. Furthermore, the number of partial areas (five with the example illustrated in FIG. 5B) is by no means limited in particular, and may be any number. In addition, although, with the example illustrated in FIG. 5B, there are gaps formed between the dot areas for ease of description, there are no gap in fact.

Further, an area ID of a partial area is identification information which varies per partial area, and the area ID of each partial area includes an area ID of an advertisement display area. For example, when the area ID of the advertisement display area is "x0001," the area ID of each partial area included in the advertisement display area is represented by "x0001-1," "x0001-2," "x0001-3" and . . . .

Further, coordinate information of a partial area is an example of partial area specifying information for specifying a partial area. When, for example, a partial area is a rectangular area, a pair of two points of coordinates (x, y) at opposing corners in the rectangular area (alternately, a plurality of coordinates on the outline of the partial area are also fine) may be coordinate information of the partial area. Further, when a partial area is a set of dot areas, the coordinate of each dot area (the coordinate of each pixel) can be the coordinate of each partial area.

Furthermore, each partial area is allocated respectively different posters according to partial area allocating processing described below, and a user ID of the allocated poster is associated with an area ID of the partial area and registered.

The system control unit 33 employs a configuration including, for example, a CPU (Central Processing Unit), a ROM (Read Only Memory) and a RAM (Random Access Memory). Further, when the CPU reads and executes various programs stored in the ROM and the memory unit, the system control unit 33 functions as, for example, a transmitting means, a position information acquiring means, a partial area specifying means, a reward information memory means, a posting information acquiring means, a contribution degree calculating means, an area allocating means and a changing means according to the present invention, and may perform processing described below.

[2. Operation of Information Providing System S]

Next, an operation of the information providing system S according to the present embodiment will be described.

(2.1. Operation of Setting Advertisement Content and Affiliate Link)

First, an operation of setting advertisement content and an affiliate link will be described using FIG. 6.

FIG. 6 is a flowchart illustrating setting processing of advertisement content and an affiliate link in the system control unit 33 of the information providing server 3. The processing of setting the advertisement content and the affiliate link is started when, for example, an operator makes a command and the number of posts or the number of views monitored exceeds a threshold, or when a request of a web page or an update request of advertisement content is received from the user terminal 1-j which the information providing site accesses. Further, a configuration may be employed where this processing of setting the advertisement content and the affiliate link is started per predetermined time (for example, every forty eight hours) according to the set time (or a set timer).

When processing illustrated in FIG. 6 is started, the system control unit 33 acquires a predetermined number of user IDs (all user IDs are also fine) from the user information database 321 (step S1).

Next, the system control unit 33 acquires posting information associated with each acquired user ID among posting information registered in the web site 2-k (only when posting information associated with the user ID is registered) (step S2). For example, the system control unit 33 sets in advance URLs of one or more web sites 2-k which are acquisition destinations of posting information, and accesses the web sites 2-k according to the URL's and acquires posting information associated with each user ID from the web server of the web sites 2-k.

Further, when the URL of a posting information acquisition destination site is registered in association with each above acquired user ID, the system control unit 33 accesses the web sites 2-k according to the URL and acquires posting information associated with each user ID from the web server of the web sites 2-k. In this case, when the posting information acquisition destination site is the web site 2-k which requires log-in upon use, the system control unit 33 logs in the web site 2-k using the user ID and the password associated with the URL of the posting information acquisition destination site and registered, and acquires posting information associated with each of the above user ID, from the web server of the web site 2-k.

Alternately, a configuration may be employed where, when the processing illustrated in FIG. 6 is started according to a request of a web page or an update request of advertisement content from the user terminal 1-j of the user who logs in an information providing site, the system control unit 33 accesses the web site 2-k according to a URL of a posting information acquisition destination site registered in association with the user ID of the user who logs in the information providing site, and acquires posting information associated with each user ID from the web server of the web site 2-k. In this case, it is possible to acquire posting information only from the web site 2-k specified by the user who logs in the information providing site. In addition, when a user ID and a password are registered in association with the URL of the posting information acquisition destination site, posting information is acquired in some cases after the user logs in the web site 2-k using the user ID and the password.

As described above, posting information including, for example, an article, a comment, a tweet, a word-of-mouth, a review and an evaluation is acquired from, for example, a blog site, a mini blog site, a review site, a word-of-mouth site and a product sales site.

Next, the system control unit 33 performs processing of specifying a product from, for example, the store information database 322 based on the acquired posting information (step S3). When, for example, a product name or a product code is extracted from a string of characters related to posting information and the extracted product name or product code is registered in the store information database 322 (that is, included in product information of a product range), a product (product ID) associated with the product name or the product code is specified. Alternately, in case of a web page in which the user inputs a review in an input column such as a review of a product set in advance, when a product name or a product code associated with and described in the input column of the web page, and the extracted product name or product code is registered in the store information database 322, a product (product ID) associated with the product name or the product code is specified. In addition, a product may be specified by referring to a database (for example, a database in which information of a product before the release is registered) other than the store information database 321.

Next, the system control unit 33 decides whether or not one or more products can be specified in step S3 (step S4). Further, when the system control unit 33 can specify one or more products (step S4: YES), information such as a product ID of the specified product, a user ID of a poster, posting information and a URL of an acquisition destination site of posting information is associated per product (per record) and registered in the posting information database 323 (step S5), the step proceeds to step S6. Meanwhile, when a product ID, a user ID, a posting date and a string of characters included in a record which is already registered in the posting information database 323 are the same as a product ID, a user ID, a posting date and a string of characters included in a record which is newly registered, a record which is already registered is updated (for example, updated) by a new record (in this case, updated when, for example, the number of views included in this record changes). Meanwhile, even when one product cannot be specified (step S4: NO), the system control unit 33 proceeds to step S6 as is.

Next, in step S6, the system control unit 33 refers to the posting information database 323, extracts a record of a product (for example, a product for which posting information is posted within recent one week) in a period T of a posting date from the current point of time to the point of time a predetermined period before in the past (for example, one week ago), and decides whether or not there are products having the number of extracted records equal to or more than a predetermined number of (for example, 10). Further, the system control unit 33 proceeds to step S7 when deciding that a product having the number of the above extracted records equal to or greater than a predetermined number (step S6: YES), and finishes the processing illustrated in FIG. 6 when deciding that there is no product having the number of extracted records equal to or greater than a predetermined number (step S6: NO). In this step S6, it is possible to extract a product which is recently focused upon to some degree by users. When, for example, the number of records of a product α is 100 in total and, among these records, the number of records having a posting date within the above period T is 10 (conditions of the predetermined number or more are satisfied), the ten records of this product α are extracted, and used in processing subsequent to step S7 (in other words, records posted in the past before this period T are not extraction targets). Meanwhile, when, for example, the number of records of the product α is 100 in total and, among these records, the number of records having the posting date in the period T is nine (conditions of the predetermined number or more are not satisfied), the records of this product α are not used in the processing illustrated in FIG. 6. In addition, a configuration may be employed where, in the processing of this step S6, all records registered in the past in the posting information database 323 are extracted irrespectively of a period from the current point of time to a point of time a predetermined period before in the past.

Next, in step S7, the system control unit 33 calculates a score which is the degree of attention based on posting information included in the above extracted records of each product per product (product ID) having the number of records equal to or more than a predetermined number. This method of calculating scores include, for example, following (a) to (d).

In addition, with calculation of this score, the number of posts, the number of views, the number of replies, the number of inbound links, the number of inbound track backs, the number of followers, and the number of retweets are for a product "score calculation elements." When the number indicated by these score calculation elements is greater, it can be said that an attention is paid to this product. Meanwhile, the number of posts for a product can be obtained by counting per product the number of above extracted records for a product. For example, the number of posts for a product of a product ID "S00001" illustrated in FIG. 4 is the number of records including the product ID. Further, the number of replies for a product can be obtained by summing up per product the number of replies included in above each extracted record of the product. For example, the number of replies for a product of the product "S00001" illustrated in FIG. 4 is a sum of the number of replies included in each record including the product ID (the same applies to the number of inbound links, the number of inbound track backs, the number of followers and the number of retweets).

(a) Calculating Method Using Score Calculation Element

In this case, the system control unit 33 calculates as a score one score calculation element (for example, the number of posts) selected in advance or a sum (for example, a sum of the number of posts and the number of views) of a plurality of score calculation elements selected in advance. Alternately, each of a plurality of score calculation elements selected in advance may be calculated as a score (in this case, for example, the number of posts is a first score, and the number of views is a second score). Meanwhile, although any score calculation element may be selected, there is an element which cannot be obtained depending on a type of posting information (a type of an article, a comment, a word, a tweet, a word-of-mouth, a review or an evaluation), and therefore it is desirable to select the number of posts or the number of views obtained according to any type. According to the calculating method (a), it is possible to quickly calculate a score. When a celebrity is a poster, the number of followers of this celebrity is several thousands and several tens of thousands (the number of users following this celebrity). Consequently, when the number of followers or the sum of each score calculation element including the number of followers is calculated as a score, the score (the degree of attention) of a product for which the celebrity is a poster increases all at once. A method of calculating a score using the number of followers in this way is effective for the sake of differently inflating the score per poster, it is possible to increase a score of a product which is highly likely to gain an attention from lots of people in the future (that is, which other people are also highly likely to pay attention to because a celebrity pays attention) (as a result, the product is likely to be determined as a product of interest in step S8 described below).

In addition, according to a configuration of, for example, multiplying a score calculation element such as the number of views obtained based on, for example, a popular blog page at a higher rank of an access ranking or posting information acquired from a blog page of a blogger set in advance, with a weighting coefficient (for example, 2) greater than other coefficients (a score calculation element obtained based on posting information acquired from a general web page, with 1 of a weighting coefficient), and calculating the sum of score calculation elements, it is possible to calculate more accurate scores. Further, according to a configuration of, for example, multiplying a record including a popular blog page at a high ranking order of an access ranking or posting information acquired from a blog page of a blogger set in advance, with a weighting coefficient (for example, 2) greater than other coefficients, and counting the records (that is, the records multiplied with a weighting coefficient greater than other coefficients are counted two times instead of being counted once), it is possible to calculate more accurate scores for the number of posts.

(b) Calculating Method Using Conversion Points of Score Calculation Element

In this case, the system control unit 33 calculates as a score the sum of conversion points of each of a plurality of score calculation elements selected in advance. FIG. 7 is a view illustrating an example of a table for converting a score calculation element into conversion points. As illustrated in FIG. 7, the number of hits required to obtain the same conversion points varies per score calculation element. For example, to obtain 20 p, while the number of posts requires "1001 to 2000," the number of inbound links may be "21 to 40." The system control unit 33 converts each selected score calculation element into conversion points by referring to the conversion table stored in, for example, the RAM, and calculates the sum of the converted conversion points as a score. According to the calculating method (b), a score is calculated taking into account a contribution rate (weight) of each score calculation element in the degree of attention of a product, so that it is possible to calculate an accurate score.

In addition, according to a configuration of, for example, multiplying conversion points obtained based on a popular blog page at a high ranking order of an access ranking or posting information acquired from a blog of a blogger set in advance, with a weighting coefficient (for example, 2) greater than other coefficients (conversion points obtained based on posting information acquired from a general web page are multiplied with "1" of a weighting coefficient), and calculating the sum of conversion points, it is possible to calculate a more accurate score.

(c) Method of Calculating Using Content of Posting Information

In this case, the system control unit 33 calculates as a score the sum of evaluation points obtained based on one of an evaluation (points) or a string of characters included in posting information. In case of an evaluation, the points of an evaluation or points obtained by multiplying points with a predetermined coefficient is obtained as evaluation points. Meanwhile, in case of a string of characters, when a word (a sentence is also fine) registered in a predetermined word list is included in the string of characters, evaluation points associated with the word can be obtained from the word list. In this word list, for example, a positive word and a negative word are registered and, while a positive word is associated with plus evaluation points, a negative word is associated with minus evaluation points. For example, a positive word and evaluation points include, for example, "operability is good->evaluation point: +2," "very pleasing->evaluation points: +3" and "recommended . . . ->evaluation points: +3," and different evaluation points are associated per word (the same applies to the sentence). Meanwhile, a negative word and evaluation points include, for example, "a price is high->evaluation points: −1," "the number of functions is a little->evaluation points: −1" and "not so good->evaluation points: −2," and different evaluation points are associated per word. In addition, posting information is represented by various people, and is positive or negative in some cases depending on, for example, linkage (modification relation) of words before and after the words. For example, while "not good" in a sentence "sound quality is not good" is evaluated as a negative word, "isn't . . . good" in a sentence "isn't sound quality good?" is added with "?" and therefore can be evaluated as a positive word. Hence, a configuration of deciding the polarity of negative or positive and learning the polarity to decide whether a word registered in the word list is positive or negative (that is, the polarity of the word registered in the word list is not fixed and can fluctuate according to learning) is more effective. In addition, the above polarity decision can adopt a known technique and will not be described in detail. Further, the system control unit 33 divides a string of characters included in posting information of a record, into a word of a predetermined length (for example, morpheme (a minimum unit of a language having a meaning)) by, for example, morphological analysis, checks whether or not the word or a combination of words is registered in a word list and, when the word or the word list is registered, acquires corresponding evaluation points from the word list (extracts per extracted record). In addition, when a plurality of words registered in the word list are included in a string of characters included in posting information in one record, the sum of evaluation points associated with each word (further, when an evaluation is also included in posting information, the points associated with the evaluation are added) is acquired as evaluation points associated with the record. Further, when even one word registered in the word list is not included in a string of characters included in posting information in one record, evaluation points associated with the record are acquired as "0." Further, the system control unit 33 sums up evaluation points associated with each record per product to calculate a score. According to the calculating method (c), a score is calculated taking into account an opinion or a feeling of a poster for a product, so that it is possible to calculate a more accurate score.

In addition, according to a configuration of, for example, multiplying evaluation points obtained based on a popular blog page at a high ranking order of an access ranking or posting information acquired from a blog page of a blogger set in advance, with a weighting coefficient (for example, 2) greater than other coefficients (evaluation points obtained based on posting information acquired from a general web page are multiplied with "1" of a weighting coefficient), and calculating the sum of evaluation points, it is possible to calculate a more accurate score.

(d) Calculating Method Using Rate of Increase of Score Calculation Element

In this case, the system control unit 33 calculates as a score the sum of the rate of increase of one score calculation element selected in advance in a predetermined period (for example, five days) and the rate of increase of each of a plurality of score calculation elements selected in advance in a predetermined period. Meanwhile, the rate of increase is calculated by, for example, dividing the number of posts on the last day of the predetermined period by the number of posts on the first day of the predetermined period and multiplying the division value with 100%. According to the calculating method (d), a score is calculated taking into account the rate of increase of, for example, the number of posts, so that it is possible to calculate a more accurate score.

In addition, a configuration may be employed where the sum of scores obtained according to some of a plurality of calculating methods (a) to (d) (for example, the calculating method (a) and the calculating method (c) are preferable) is calculated as a final score to obtain a more accurate score. In this case, by multiplying the score obtained according to each calculating method with a weighting coefficient matching the degree of importance and calculating the sum of the scores as a final score, it is possible to obtain a more accurate score. In addition, a configuration may be employed where a score is calculated according to a calculating method other than (a) to (d).

When the score is calculated as described above, the system control unit 33 determines (determines a product ID) a product (hereinafter "product of interest") which is an advertisement display target based on the calculated score of each product (step S8). For example, the system control unit 33 compares scores of each product and determines a product of the highest score as a product of interest.

Meanwhile, when the score (for example, a first score or a second score) of each selected score calculation element is calculated according to the above calculating method (b), the system control unit 33 determines a ranking of each score calculating element per score, then calculates the sum of respective ranking orders in the ranking (an average is also fine), compares the sum of the ranking orders and determines a product of the smallest sum of the ranking orders as a product of interest. When, for example, the ranking order of the score of the number of posts for a product of a product ID "S00001" is the first and the ranking order of the score of the number of views is the third, the sum of the ranking orders is "four" (the average is two).

In addition, the above determined product ID of the product of interest and the score of the product of interest are associated and stored in, for example, the RAM.

Next, the system control unit 33 calculates the degree of contribution per poster of posting information (poster associated with posting information) for the product of interest based on the score of the above product of interest determined in step S8 (step S9). For example, the system control unit 33 calculates the score of each poster as the degree of contribution by partitioning the score of the product of interest into a score of each poster which contributes to the score. The score of the product of interest is calculated based on posting information from each poster and, when a score associated with each posting information can be learned, it is possible to decide a poster associated with each score. Meanwhile, the score of each poster is the degree of contribution of a poster for the score (the degree of attention) for selecting a product of interest which is a posting target as a commercial transaction target (selecting as a purchase target by a purchaser). For example, the score of the product of interest is 22 p, a score of a poster a is 10 p, a score of a poster b is 6 p, a score of a poster c is 3 p, a score of a poster d is 2 p and a score of a poster e is 1 p. In this case, the degree of contribution of the poster a is 45% (10 p/22 p), the degree of contribution of the poster b is 27% (6 p/22 p), the degree of contribution of the poster c is 14% (3 p/22 p), the degree of contribution of the poster d is 9% (2 p/22 p) and the degree of contribution of the poster e is 5% (1 p/22 p). In this case, the degree of contribution of the poster a is the highest.

Next, the system control unit 33 performs processing (hereinafter "partial area allocating processing") of allocating (associating) per poster a partial area (a partial area included in an advertisement display area set in advance) according to the degree of contribution of each poster calculated in step S9 (step S10). With this partial area allocating processing, the system control unit 33 compares the degree of contribution of each poster, sorts the degrees in order from the highest degree of contribution, determines a ranking of the degree of contribution and determines a poster from the first (the highest degree of contribution) to a predetermined ranking order (for example, a ranking order corresponding to the number of partial areas determined in advance) in the ranking. For example, when the number of partial areas is five as illustrated in FIG. 5A or FIG. 5B, the above predetermined ranking order is the fifth. Further, the system control unit 33 allocates each poster to each partial area based on the determined degree of contribution (the ranking order of the degree of contribution) of each poster. A partial area of a larger size (or a higher distribution rate of dot areas) is allocated to, for example, a poster having a higher degree of contribution. Further, a partial area including a position which is likely to be specified (by, for example, a clicking operation using a mouse or a tapping operation on a touch panel) by a viewer is allocated to, for example, a poster having a higher degree of contribution. Meanwhile, the position which is likely to be specified by a viewer corresponds to a position which is specified in the past performance a great number of times. The specifying count of each partial area (for example, the sum of the clicking count and the tapping count) is registered in a specifying count table (an example of a specifying count memory means) in association with an area ID of each partial area, and the specifying count registered every time the partial area is specified is incremented. Consequently, it is possible to specify a partial area including a position which is specified in the past performance a great number of times by referring to the specifying count. That is, the system control unit 33 compares the specifying count of each partial area registered in the specifying count table, and allocates a poster having a comparatively higher degree of contribution (for example, the ranking of the degree of contribution is a high ranking order (for example, the first)) to a partial area of a relatively greater specifying count (for example, the ranking of the specifying count is a high ranking order (for example, the first)). Further, another example of a position which is likely to be specified by a viewer corresponds to a position at which information of triggering the viewer to specify the position is displayed. The information for triggering the viewer to specify the position includes, for example, an image such as characters such as "click here" or an arrow, or a combination of balloons and characters. The position at which such display is provided is highly likely to be specified unconsciously by a viewer. Further, the system control unit 33 associates the user of a poster allocated to each partial area with the area ID of each partial area to register in the partial area information database 324.

In addition, partial area allocating processing may be configured to determine a partial area (that is, determine the number of partial areas and the size (or the distribution rate of dot areas)) based on the calculated degree of contribution per poster. In this case, the system control unit 33 determines posters from the first to a predetermined ranking order based on the number of posters of posting information for the above product of interest in the ranking of the above determined degree of contribution. When, for example, the number of posters is a predetermined number (for example, five) or more, the posters from the first to a ranking order corresponding to predetermined number (for example, the fifth) are determined, and, when the number of posters is less than a predetermined number (for example, three), the posters from the first to a ranking order corresponding to the above number of posters (for example, the third) are determined. Further, the system control unit 33 calculates the total sum of the above determined degree of contribution of the poster, and calculates the percentage (%) (occupancy) of the degree of contribution in the calculated total sum per determined poster.

Furthermore, the system control unit 33 determines each partial area based on the calculated percentage of each degree of contribution. In other words, the size of a partial area (in case of FIG. 5A) or the distribution rate of dot areas of each partial area (in case of FIG. 5B) is determined. When, for example, the percentage of the degree of contribution is 50%, half of an advertisement display area is determined as a partial area. Alternately, when the percentage of the degree of contribution is 50%, the distribution rate of dot areas of a partial area is determined as 50%. Further, the system control unit 33 allocates a poster associated with the above degree of contribution (percentage) used to determine the partial area, to the partial area.

Next, the system control unit 33 determines a store which sells a store of interest determined in step S8 (determining in a store ID) (step S11). For example, the system control unit 33 determines a store associated with store information including information indicating a product ID of a product of interest and affiliate reward payment availability, referring to the store information database 322. When there are a plurality of stores associated with store information including the above product ID of the product of interest and the information indicating affiliate reward payment availability, the system control unit 33 determines one store from a plurality of stores based on, for example, at least one of sales price information of the product of interest and stock information of the product of interest included in store information of each store. For example, a store having a stock of the product of interest is selected. Alternately, a store having a stock of the product of interest and offering the cheapest sales price of the product of interest is determined. By this means, it is possible to quickly execute commercial transaction of the product of interest at a store which provides the product at the cheapest price or a store which surely has a stock of the product, for the user who browses advertisement content of the product of interest. A configuration may be employed where, when one store is not determined, one store may be determined at random, and each store makes a bid for advertisement content display to determine a store offering the highest bid.

Further, the store ID of the store determined for the product of interest is associated with, for example, a product ID of the product of interest and stored in, for example, the RAM.

Next, the system control unit 33 generates advertisement content of the product of interest determined in step S8 (step S12). For example, at least one of product image data and text data of product description included in product information of the above determined store is extracted from the store information database 322 to generate advertisement content (for example, advertisement content configured with an image of the same size as the above advertisement display area) based on the extracted data.

Next, the system control unit 33 sets the above generated advertisement content (banner content: 1001.gif) as information displayed in the advertisement display area including each partial area to which the above poster is allocated, and sets an affiliate link to a product purchase procedure page associated with the store determined in step S11, to the advertisement display area (step S13). This affiliate link (for example, <a . . . </a>) is configured including, for example, a link reference phrase (for example, href=), a URL of a purchase procedure page ("http://.afl.xxxx.abc.co.jp/ . . . "), a product ID of a product of interest determined in step S8, a store ID of a store determined in step S11, an area ID of an advertisement display area including each partial area to which the poster is allocated, and specifying information of advertisement content to which a link is established (for example, target="#blank"> <IMG src="http://www.abc.com/banner/1001.gif">), and is set (described) in a tag which defines the above advertisement display area in structured document which configures a web page of a setting target. In addition, the URL of the product purchase procedure page included in the affiliate link, the product ID of the product of interest, the store ID of the store and the area ID of the advertisement display area configure the affiliate URL (the product ID, the store ID and the area ID are, for example, encrypted).

Next, the system control unit 33 stores, for example, a structured document file configuring a web page in which the above advertisement content and the affiliate link are set in the advertisement display area, in a memory area indicated by the URL which the user terminals 1-j can access (step S14). By this means, when one user terminal 1-j makes a web page request, the system control unit 33 transmits a web page in which the advertisement content and the affiliate link are set in the advertisement display area, to the user terminal 1-j which made this request.

In addition, when the processing illustrated in FIG. 6 is started in response to the web page request from user terminal 1-j of the user who logs in the information providing site, the system control unit 33 transmits the web page in which the above advertisement content and the affiliate link are set in the advertisement display area, to the user terminal 1-j which made the request to display the web page. Alternately, the processing illustrated in FIG. 6 is started in response to an update request advertisement content from the user terminal 1-j of the user who logged in the information providing site, the system control unit 33 transmits the advertisement content and the affiliate link to the user terminal 1-j (web browser) which made the request and sets (inserts) the above advertisement content and the affiliate link in the advertisement display area of a web page. By this means, the advertisement content in which a link is established is displayed on a web page.

(2.2. Affiliate Reward Paying Operation)

Next, an affiliate reward paying operation will be described using FIG. 8.

Figure 8A:
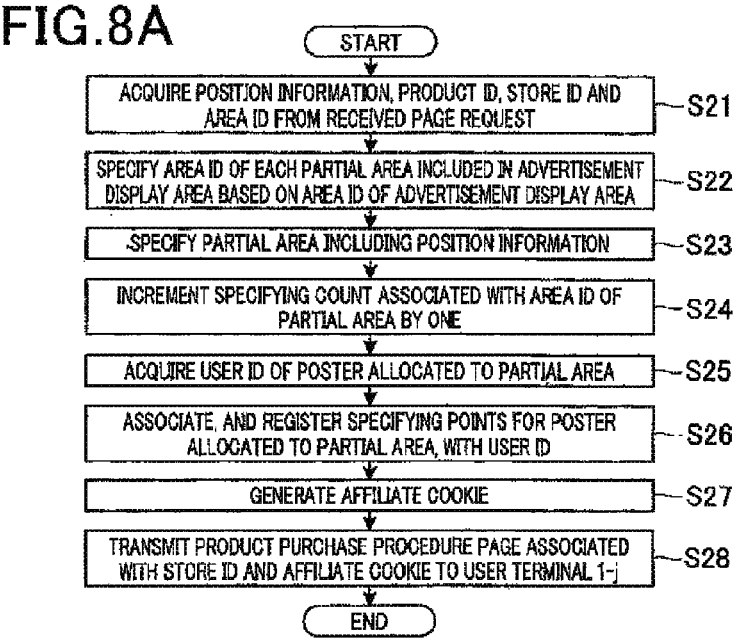
FIG. 8A is a flowchart illustrating processing upon reception of a page request in the system control unit 33 of the information providing server 3.
Figure 8B:
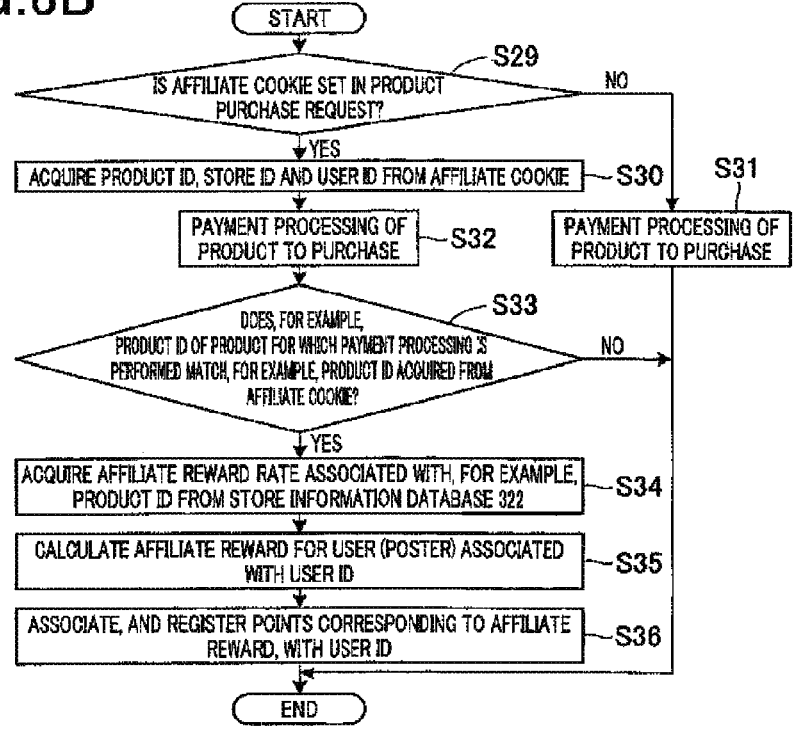
FIG. 8B is a flowchart illustrating processing upon reception of a product purchase request in the system control unit 33 of the information providing server 3.

FIG. 8A is a flowchart illustrating processing upon reception of a page request in the system control unit 33 of the information providing server 3, and FIG. 8B is a flowchart illustrating processing upon reception of a product purchase request in the system control unit 33 of the information providing server 3.

When, in a state where a web page in which the advertisement content and the affiliate link are set is displayed on a window screen received from the user terminal 1-j, an arbitrary position in the advertisement display area (in other words, advertisement content) of the advertisement content is specified by a user's operation (for example, a clicking operation using the mouse or a tapping operation on the touch panel), the web browser of the user terminal 1-j transmits information of the position (the coordinate on the web page) specified in the advertisement display area and a page request including the affiliate URL set in the advertisement display area, to the information providing server 3. Further, when receiving the page request (that is, the information providing server 3 acquires, for example, the position information from the user terminal 1-j), the system control unit 33 of the information providing server 3 starts processing illustrated in FIG. 8A.

The processing illustrated in FIG. 8A is started, and the system control unit 33 acquires the position information, the product ID of the product of interest, the store ID of the store and the area ID of the advertisement display area from the received page request (step S21).

Next, the system control unit 33 specifies the area ID of each area included in the advertisement display area based on the above acquired area ID of the advertisement display area, referring to the partial area information database 324 (step S22).

Next, the system control unit 33 specifies the partial area including this position information (coordinate) by comparing coordinate information of each partial area associated with the specified area ID of each partial area and position information acquired in step S21 (step S23). For example, the system control unit 33 finds a coordinate group which defines the range of each partial area from coordinate information of each partial area, and specifies the partial area associated with the coordinate group including the position information (coordinate) acquired in step S21. The specified partial area is specified by a user's operation.

Next, the system control unit 33 increments by one the specifying count associated with the area ID of the partial area specified in step S23 among the specifying count of each partial area (for example, the total sum of the clicking count and the tapping count) registered in a specifying count table (an example of a specifying count memory means) stored in association with the area ID of the advertisement display area acquired in step S21 (step S24). Thus, every time the partial area is specified in step S23, the specifying count of the specified partial area registered in the specifying count table is incremented. Based on this specifying count, it is possible to decide how many times the partial area is specified by the viewer.

Next, the system control unit 33 acquires the user ID (that is, the user ID associated with the area ID of the specified partial area) of a poster allocated to the specified partial area, from the partial area information database 324 (the user is specified based on the area ID) (step S25).

Next, the system control unit 33 associates specifying points (an example of reward information) paid for the poster allocated to the partial area specified in step S23, with the user ID of the poster (the user ID acquired in step S25) to register in the user information database 321 (step S26). In other words, points for clicking or tapping of the partial area allocated to the poster are added (points are given) to the points registered in association with the user ID. Consequently, it is possible to increase the poster's motivation for posting.

Next, the system control unit 33 generates an affiliate Cookie indicating that the user goes through an affiliate link (step S27). Meanwhile, the affiliate Cookie includes, for example, a product ID and a store ID acquired from the affiliate URL, a user ID (an area ID of a partial area associated with the user ID is also fine) acquired in step S25 and an expiration date (for example, a date after thirty days) of the Cookie.

Next, the system control unit 33 transmits a product purchase procedure page associated with the above acquired store ID and the generated affiliate Cookie (set in a response header for transmitting the product purchase procedure page) to the user terminal 1-j (step S28).

Further, when, for example, the number of products purchased by the user, a payment method and a shipping address of the products are selected in the product purchase procedure page (or a page to which the page transitioned) and a determining button for determining purchase of the products is specified, a product purchase request including the selected information is transmitted to the information providing server 3. Thus, when the above affiliate Cookie is stored in the user terminal 1-j, the affiliate Cookie is set in a header of the product purchase request and then the product purchase request is transmitted to the information providing server 3.

In addition, even when the product purchase procedure is stopped halfway after the product purchase procedure page is displayed (for example, display of the page is finished or the web browser is finished), the affiliate Cookie is stored in the user terminal 1-j until an expiration date of the affiliate Cookie, so that, when the product purchase procedure is performed in this period, the affiliate Cookie is included in the product purchase request.

Further, when the system control unit 33 of the information providing server 3 receives a product purchase request, the system control unit 33 of the information providing server 3 starts the processing illustrated in FIG. 8B. When the processing illustrated in FIG. 8B is started, the system control unit 33 decides whether or not the affiliate Cookie is set in the received product purchase request (step S29). Further, when deciding that the affiliate Cookie is not set (step S29: NO), the system control unit 33 proceeds to step S31. Meanwhile, when deciding that the affiliate Cookie is set (step S29: YES), the system control unit 33 acquires the product ID, the store ID and the user ID of the poster from the affiliate Cookie (step S30), and proceeds to step S32. In addition, a configuration may be employed where the product ID, the store ID and the user ID of the poster are acquired from the user information database 321 using as a key the user ID (specified when the user logs in) of the user of the user terminal 1-j which has transmitted the product purchase request.

Next, in step S31 or S32, the system control unit 33 performs payment processing of products purchased based on information, such as the number of purchased products, a payment method and a shipping address of the products from the received product purchase request.

Next, the system control unit 33 decides whether or not the product IDs of the products for which payment processing is finished and the store ID of the store which sells the products match the product IDs and the store ID acquired in step S30 (step S33). Further, when deciding that the product IDs and the store IDs do not match (step S33: NO), the system control unit 33 finishes the processing illustrated in FIG. 8B. Meanwhile, when deciding that the product IDs and the store IDs match (step S33: YES), the system control unit 33 acquires the affiliate reward rate associated with the product IDs and the store IDs from the store information database 322 (step S34).

Next, the system control unit 33 calculates the amount obtained by multiplying the above total amount of the products for which the payment processing is performed, with the affiliate reward rate as the affiliate reward for the user (poster) associated with the user ID acquired from the above affiliate Cookie (step S35).

Next, the system control unit 33 associates the points corresponding to the affiliate reward calculated for the user (poster) associated with the user ID acquired in step S30, with the user ID to register in the user information database 321 (step S36). In other words, points associated with the above affiliate reward are added (points are given) to the points registered in association with the user ID. As described above, when the user purchases and pays for products through an affiliate link set in an advertisement display area which displays advertisement content of a product of interest, points indicating an affiliate reward paid for a poster associated with posting information of the product (a poster allocated to the partial area specified by a product purchaser) are associated with the user ID of the poster and stored.

In addition, a configuration may be employed in case of a blog page is opened by a user in which a web page in which the affiliate link is set where, when the user purchases and pays for a product through the affiliate link, points indicating an affiliate reward are given not only to a poster of posting information for the product but also to the affiliator of the blog page. In this case, the user ID of the affiliator of the blog page is also included in the affiliate link according to processing in step S13, and the user ID of the affiliator of the blog page is also included in, for example, an affiliate Cookie according to processing in step S27.

(2.3. Operation of Changing Allocation of Poster to Partial Area)

Next, an operation of changing an allocation of a poster to a partial area will be described.

Allocation changing processing related to the operation of changing an allocation of the poster to this partial area is started by the system control unit 33 when predetermined conditions are satisfied. These predetermined conditions include that, for example, the specifying count of a partial area exceeds a threshold. According to this allocation changing processing, it is possible to change an allocation to an adequate allocation according to a situation after the partial area is allocated.

For example, the system control unit 33 starts allocation changing processing per predetermined time (for example, every twenty four hours) according to the set time (or a set timer), compares the specifying count of each partial area registered in the above specifying count table, sorts the specifying count in order from the highest specifying count and determines a ranking of the specifying count. Further, the system control unit 33 allocates each poster to each partial area (the same partial area as the previous partial area is allocated in some cases) based on the determined specifying count of each partial area (the ranking order of the specifying count). For example, a partial area which is specified a greater number of times is allocated to a poster of a higher degree of contribution. By this means, it is possible to change an allocation such that the poster of the highest degree of contribution is allocated to a partial area which is actually specified a greater number of times by the user even when, for example, the size is small.

Alternately, the system control unit 33 decides whether or not the specifying count exceeds a threshold (for example, fifty times) in step S24 when the specifying count registered in the specifying count table is incremented by one, and starts allocation changing processing when the specifying count exceeds the threshold. With this allocation changing processing, the system control unit 33 changes an allocation by switching between a poster allocated to a partial area (for example, the partial area A illustrated in FIG. 5A) which is specified a number of times greater than the threshold, and a poster allocated to another partial area (for example, the partial area B of the largest size other than the partial area which is specified a number of times greater than the threshold). Consequently, it is possible to allocate the partial area which is likely to be specified, to a poster to whom a partial area which is specified a number of times less than a threshold is allocated.

As described above, according to the embodiment, it is possible to increase channels in addition to conventional affiliate programs through which, for example, affiliators can get rewards. Further, a product of interest which is an advertisement display target is determined based on posting information posted by a poster, so that it is possible to increase a poster's motivation for positing (the poster's diligent effort of posting is paid, and it is expected that the poster becomes more eager to perform a posting operation more than ever). Furthermore, for example, the size and the allocation rate of partial areas to be allocated are determined according to the degree of contribution of each poster for the product of interest, so that it is possible to increase the probability that the partial area to be allocated to the poster of the high degree of contribution is specified and, consequently, to increase the probability that a reward is given to the poster. It is possible to get a big reward for a poster compared to a case where the reward is simply allocated at a rate associated with the degree of contribution per poster, and further increase a poster's motivation for posting. Further, points corresponding to an affiliate reward ("the amount calculated by multiplying the total amount of products for which payment processing is performed, with the affiliate reward rate" calculated in step S35) are given to a poster associated with the specified partial area (that is, the affiliate reward is paid for the poster associated with the specified partial area), so that it is not necessary to perform calculation to distribute a reward at the rate matching the degree of contribution of each of a plurality of posters. Consequently, it is possible to reduce a load on the system, and prevent, for example, fractional numbers from being generated in the amount multiplied with the affiliate reward rate by skipping this calculation.

REFERENCE SIGNS LIST
1-j USER TERMINAL
2-k WEB SITE
3 INFORMATION PROVIDING SERVER
31 COMMUNICATION UNIT
32 MEMORY UNIT
33 SYSTEM CONTROL UNIT
321 USER INFORMATION DATABASE
322 STORE INFORMATION DATABASE
323 POSTING INFORMATION DATABASE
324 PARTIAL AREA INFORMATION DATABASE
NW NETWORK
S INFORMATION PROVIDING SYSTEM

The invention claimed is:

1. An information providing device which provides display data including an advertisement display area, to a terminal device through a network,
the information providing device comprising:
a poster information memory means that associates and stores partial area specifying information for specifying a partial area included in the advertisement display area, and poster specifying information for specifying for a poster, a partial area in the advertisement display area;
a transmitting means that transmits display data including the advertisement display area, to the terminal device;
a position information acquiring means that acquires position information specified in the advertisement display area, from the terminal device;
a partial area specifying means that specifies the partial area including the acquired position information; an area allocating means that allocates the respective partial area for said poster according to a degree of contribution associated with posting information of said poster; and
a reward information memory means that specifies the poster based on partial area specifying information associated with a partial area specified by the partial area specifying means, and associates and stores information of a reward paid for the specified poster and the poster specifying information in the poster information memory means.

2. The information providing device according to claim 1, wherein, when commercial transaction is performed through link information associated with a site which is set in the advertisement display area and in which commercial transaction of the commercial transaction target is performed, the reward information memory means associates and stores information of the reward paid for the poster associated with the partial area included in the advertisement display area in which the link information is set, and the poster specifying information, in the poster information means.

3. The information providing device according to claim 1, further comprising:
a posting information acquiring means that acquires the posting information associated with the poster specifying information registered in a predetermined site on the network; and
a contribution degree calculating means that calculates the degree of contribution associated with the posting information for said poster, based on the acquired posting information.

4. The information providing device according to claim 2, further comprising:
a posting information acquiring means that acquires the posting information associated with the poster specifying information registered in a predetermined site on the network;
a contribution degree calculating means that calculates the degree of contribution associated with the posting information for said poster, based on the acquired posting information.

5. The information providing device according to claim 3, wherein the area allocating means allocates a partial area which displays information for triggering specifying for a poster of the highest degree of contribution.

6. The information providing device according to claim 4, wherein the area allocating means allocates a partial area which displays information for triggering specifying for a poster of the highest degree of contribution.

7. The information providing device according to claim 1, further comprising:
a specifying count memory means that stores a specifying count of the partial area for each partial area; and
wherein the area allocating means compares specifying counts in the respective partial areas stored in the specifying count memory means, and allocates the poster of a relatively high degree of contribution, to a partial area of a relatively high specifying count.

8. The information providing device according to claim 2, further comprising:
a specifying count memory means that stores a specifying count of the partial area for each partial area; and
wherein the area allocating means compares specifying counts in the respective partial areas stored in the specifying count memory means, and allocates the poster of a relatively high degree of contribution, to a partial area of a relatively high specifying count.

9. The information providing device according to claim 3, further comprising:
a specifying count memory means that stores a specifying count of the partial area for each partial area,
wherein the area allocating means compares specifying counts in the respective partial areas stored in the specifying count memory means, and allocates the poster of a relatively high degree of contribution, to a partial area of a relatively high specifying count.

10. The information providing device according to claim 1, further comprising:
a changing means that changes a poster allocated to the partial area, based on a predetermined condition.

11. The information providing device according to claim 2, further comprising:
a changing means that changes a poster allocated to the partial area, based on a predetermined condition.

12. The information providing device according to claim 3, further comprising:
a changing means that changes a poster allocated to the partial area, based on a predetermined condition.

13. The information providing device according to claim 7, further comprising:
a changing means that changes a poster allocated to the partial area, based on a predetermined condition.

14. The information providing device according to claim 8, further comprising:
a changing means that changes a poster allocated to the partial area, based on a predetermined condition.

15. The information providing device according to claim 9, further comprising:
a changing means that changes a poster allocated to the partial area, based on a predetermined condition.

16. The information providing device according to claim 10, further comprising:
a specifying count memory means that stores a specifying count of the partial area for each partial area,
wherein the changing means changes a poster allocated to a partial area comprising the specifying count exceeding a threshold.

17. The information providing device according to claim 11, further comprising:
a specifying count memory means that stores a specifying count of the partial area for each partial area,
wherein the changing means changes a poster allocated to a partial area comprising the specifying count exceeding a threshold.

18. The information providing device according to claim 12, further comprising:
a specifying count memory means that stores a specifying count of the partial area for each partial area,
wherein the changing means changes a poster allocated to a partial area comprising the specifying count exceeding a threshold.

19. The information providing device according to claim 13,
wherein the changing means changes a poster allocated to a partial area comprising the specifying count exceeding a threshold.

20. The information providing device according to claim 14,
wherein the changing means changes a poster allocated to a partial area comprising the specifying count exceeding a threshold.

21. The information providing device according to claim 15, wherein the changing means changes a poster allocated to a partial area comprising the specifying count exceeding a threshold.

22. The information providing device according to claim 1, wherein the size of the partial area varies according to the degree of contribution of said poster such that a first poster with a higher degree of contribution than a second poster is allocated a larger partial area than the second poster.

23. The information providing device according to claim 1, wherein the poster specifying information specifies the poster posting information on a product or a service, for said partial area, when a record of the product or the service in the posting information exceeds a predetermined number.

24. The information providing device according to claim 3, wherein the contribution degree calculating means calculates the degree of contribution associated with the posting information for said poster by determining a total score associated with the posting information by adding a score corresponding to said poster's post information and determining a percentage of contribution of said poster to the total score.

25. The information providing device according to claim 24, wherein the area allocating means divides the advertisement display into a plurality of partial areas and allocates a different partial area to the poster based on the percentage of contribution by said poster that posted the information to the total score.

26. A method of processing reward payment executed by a computer which provides display data including an advertisement display area, to a terminal device through a network, the method performed by a controller including a processor and memory, comprising:

associating and storing partial area specifying information for specifying a partial area included in the advertisement display area and poster specifying information for specifying for a poster, a partial area in the advertisement display area;

transmitting display data including the advertisement display area, to the terminal device;

acquiring, by the controller, position information specified in the advertisement display area, from the terminal device;

specifying the partial area including the acquired position information;

allocating, by the controller, the partial area for said poster according to a degree of contribution associated with posting information of said poster; and specifying, by the controller, the poster based on partial area specifying information associated with a partial area specified by the partial area specifying means, and associating and storing information of a reward paid for the specified poster and the poster specifying information.

* * * * *